United States Patent [19]

Petersen

[11] Patent Number: 5,000,406
[45] Date of Patent: Mar. 19, 1991

[54] NOVEL APPARATUS FOR CATCHING LEAVES OR OTHER DEBRIS

[76] Inventor: Raymond C. Petersen, 8720 Woodley Ave., #208, Sepulveda, Calif. 91343

[21] Appl. No.: 413,919

[22] Filed: Sep. 27, 1989

[51] Int. Cl.[5] .................................................. B65B 67/00
[52] U.S. Cl. ......................................... 248/99; 294/1.1; 248/145.6; 248/101
[58] Field of Search .................. 248/99, 95, 101, 100, 248/97, 152, 145.6; 294/1.1; 220/1 T, 85 H, 18

[56] References Cited

U.S. PATENT DOCUMENTS

| | | | |
|---|---|---|---|
| 3,017,653 | 1/1962 | Bird | 294/1.1 X |
| 3,233,854 | 2/1966 | Morgan | 248/99 |
| 4,052,764 | 10/1977 | Groff | 248/99 X |
| 4,268,081 | 5/1981 | Hawkinson | 248/99 X |
| 4,269,441 | 5/1981 | Hirsch | 294/1.1 |
| 4,287,701 | 9/1981 | Washington | 248/99 X |
| 4,530,533 | 7/1985 | Dieter | 248/99 X |
| 4,629,233 | 12/1986 | Pfisterer | 294/1.1 |
| 4,775,123 | 10/1988 | Borland et al. | 248/99 |
| 4,805,858 | 2/1989 | Taylor | 248/99 |
| 4,832,292 | 5/1989 | Beckham | 248/95 |

*Primary Examiner*—Karen J. Chotkowski
*Attorney, Agent, or Firm*—Nilsson, Robbins, Dalgarn, Berliner, Carson & Wurst

[57] ABSTRACT

A novel apparatus for catching leaves, trash, yard trimmings or other debris is provided, the apparatus being particularly adapted to catch debris without having to hold the plastic bag or apparatus open by any person. The novel apparatus includes a housing fabricated from plastic, metal or the like, frontal opening for receiving the debris and rear opening of which the edges define a lip and channel where a strap or bag retainer is used to hold a plastic trash or lawn bag to the apparatus so that it will not slip off when in use. The apparatus can also be used as a portable trash can by hooking onto a wall or other forms. In addition the apparatus can be used as a trash receptacle for holding a small amount of debris until a bag can be attached. Finally, the apparatus is provided with attachment for handles of various sizes and shapes for different uses or for the comfort of the person using the apparatus.

2 Claims, 2 Drawing Sheets

NOVEL APPARATUS FOR CATCHING LEAVES OR OTHER DEBRIS

BACKGROUND OF THE INVENTION

1. Field of the Invention

The present invention relates to a novel apparatus for catching leaves, trash, yard trimmings, or other debris (hereinafter collectively known as "debris") normally placed in a plastic trash bag. Particularly, the present invention relates to such novel apparatus adapted to catch debris without the necessity of one person holding the mouth of the bag open and another person sweeping or scooping debris into the bag. More particularly, the present invention relates to a novel apparatus adapted to sit flat on the ground, freestanding, with the leading edge tapered to meet the ground so that debris can be easily swept or raked into it without having to hold the plastic bag or the novel apparatus. The present invention further relates to a novel apparatus hooked onto a wall or other form as a portable trash can. Finally, the present invention relates to a novel apparatus which can be stacked inside the opening of another apparatus for storing, transporting and displaying purposes.

Broadly, the primary advantage of this invention is to provide a novel apparatus for the purpose mentioned, which overcomes various limitations and disadvantages of prior systems used in conjunction with plastic lawn and trash bags for catching debris, especially with respect to adaptability for efficiently handling various types of debris structural simplicity, economy of manufacture, ease of operation and convenience of storage. More specific objects and advantages of the invention will hereinafter be made clear or become apparent to those skilled in the art during the course of explanation of a preferred embodiment of the invention.

2. Description of the Prior Art

Plastic lawn and trash bags and related products such as trash cans, trash receptacles in combination with the use of lawn or leaf rake, broom or shovel for catching debris are well known. The use of any of the above systems, however, inevitably requires some means to keep the tops (opening) of the plastic bag open in order to sweep, rake or shovel the debris into the bag.

In one method, one person has to hold the mouth of a bag open while another loads debris into the bag. In situations, where one is working alone, either one has to hold one's foot in one side of the opening and sweep or rake one's foot, holding the top of the bag with the other hand, or drag open the bag mouth, holding one side of the bag up while putting trash into the bag with the other hand, one handful at a time.

Moreover, any of the prior art systems mentioned requires much time and effort to sweep, scoop or rake up and bag large amounts of debris. There is the additional difficulty to pull a loaded and packed down bag out of a trash can, where the bag has been placed inside a trash can in order to drag the mouth of the bag open so it can be filled.

SUMMARY OF THE INVENTION

Thus, it is an advantage of the present invention to provide a novel apparatus for catching debris more conveniently and efficiently.

Another advantage is to provide such an apparatus with a rigid opening, mouth or scoop that is used in conjunction with plastic lawn and trash bags by keeping the top (opening) of the plastic bag open to a person by freeing both his hands.

Another advantage is provide such an apparatus eliminating the need of having one person holding the mouth of a bag open while another loads leaves or other debris into the bag.

Another advantage is to provide such an apparatus for a person working alone by eliminating the need to have one's foot on one side of the opening and sweep or rake over one's foot holding the top of the bag with the other hand.

Another advantage is to provide such an apparatus for a person working alone by eliminating the need to drag open the bag mouth, opening one side of the bag up by putting debris into the bag with the other hand, one handful at a time.

Another advantage is to provide such an apparatus for a person working in a yard, shop, lawn or business to sweep, scoop or rake up and bag large amounts of debris in a shorter period of time.

Another advantage is to provide such an apparatus to eliminate the difficulty of trying to pull a loaded and packed down bag of debris out of a trash can, when the bag has been placed inside the trash can in order to drag the mouth of the bag open so it can be filled.

Another advantage is to provide such an apparatus as a portable trash can by hooking onto a wall or other forms.

Another advantage is to provide such an apparatus as a trash receptacle for holding a small amount of debris until a bag can be attached.

A further advantage is provide such an apparatus with various sizes and shapes of handles for different uses or for the comfort of the person using the apparatus.

BRIEF DESCRIPTION OF THE DRAWINGS

The above and other features of the present invention may be more fully understood from the following detailed description, taken together with the accompanying drawings, wherein similar characters refer to similar elements throughout and in which.

DESCRIPTION OF THE PREFERRED EMBODIMENT

Figure 1:
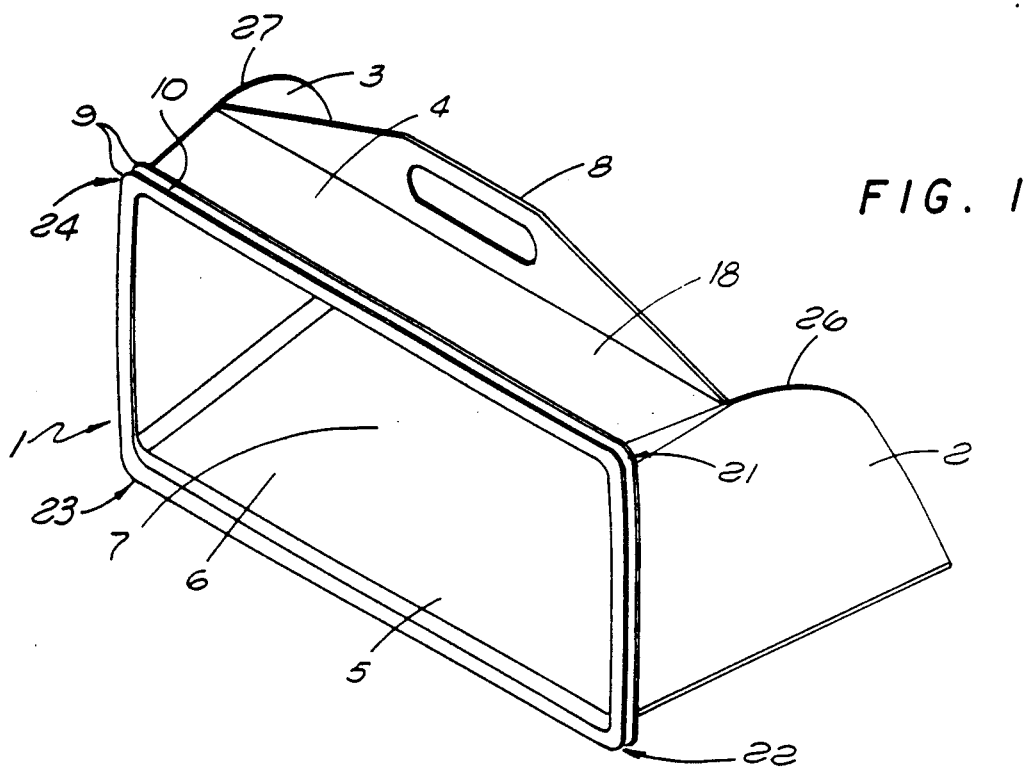
FIG. 1 is a perspective view of the novel apparatus for catching debris in which the plastic bag, the strap/bag retainer (and hinged door) have been removed for clarity of illustration.
Figure 2:
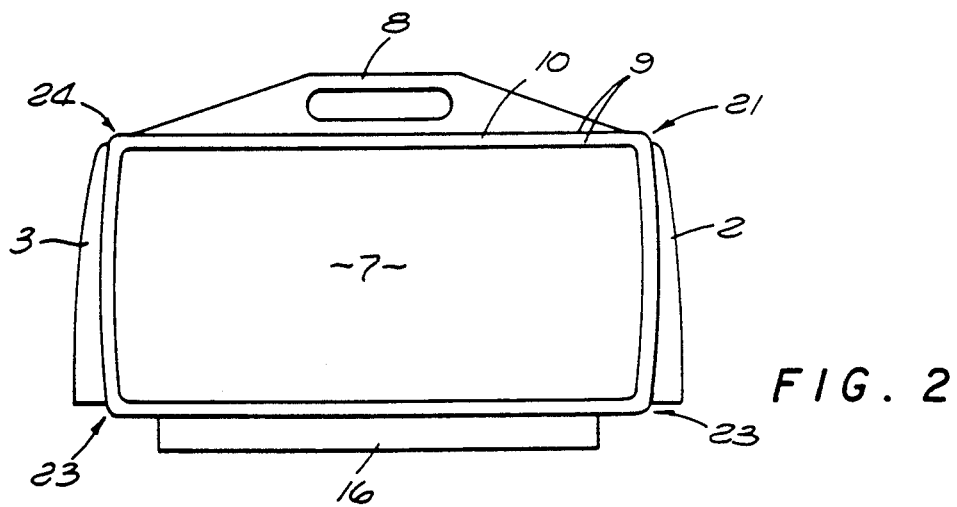
FIG. 2 is a rear cross sectional view of the apparatus as shown in FIG. 1.
Figure 3:
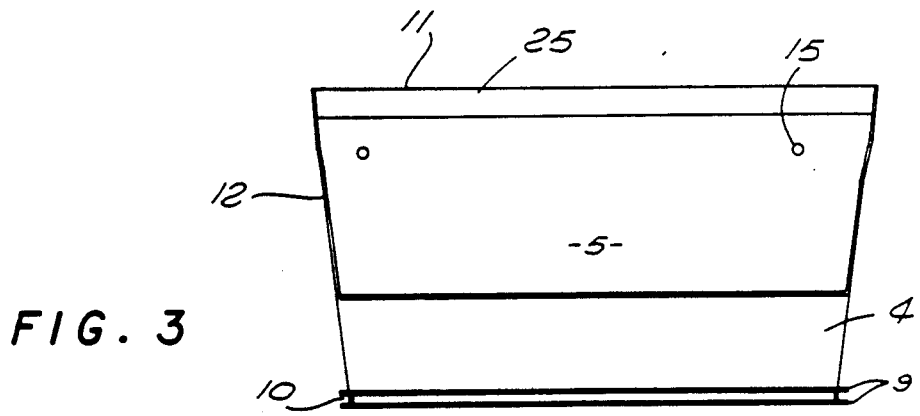
FIG. 3 is a top plan cross sectional view showing the top section of the apparatus as shown in FIG. 1.

As required, details of illustrative embodiments of the invention are disclosed herein.

Referring now to FIGS. 1-5, applicant's apparatus for catching debris is shown in greater detail. As therein illustrated the apparatus 1 includes a housing 18 comprising first and second sidewalls 2 and 3, respectively, a top wall 4 (with a slot for handle attachment 8), bottom wall 5. The structure thus with rear opening 6 and frontal opening 17 defines a debris catching chamber 7. The rear edges of the sidewalls 2 and 3, the bottom wall 5 and top wall 4 defines a lip 9 and channel 10 where a strap/bag retainer 19 is used to hold a plastic bag 20 to the apparatus so that it will not slip off when in use. Noted that the corners 21-24 of the channel 10 are rounded to prevent accidental injury to the user during operation. Furthermore, the dimensions of the rear edges of the side walls 2 and 3, the bottom wall 5 and top wall 4 are limited by the dimensions of the plastic bag 20 used.

The bottom wall 5 is flat with a tapered edge 12 extending outwardly towards a slight rake 11 in the front. Underneath the bottom wall 5, towards the rear, is the tilting structure 16, in the form a strip tilting the apparatus towards the ground, thus allowing the user to sweep, rake or scoop smaller particles into the apparatus without having to hold the plastic bag of the apparatus. Holes 15 and 16 are drilled into the leading edge of the bottom wall 5 to allow the apparatus to be hooked onto a wall or other forms to provide a portable trash can (the bottom of the bag would rest on the ground so that the bag would not tear from the weight on the bottom). Once full, the bag can be slipped off and tied shut and a new bag slipped over the back of the apparatus.

The front edge 25 is wide enough to accept the sweep pattern of a common lawn or leaf rake, or broom. The top wall 4 inclines downward and tapers outwardly toward the front of the apparatus. It should be noted that the top wall generally is about one-third to one-half the length of the bottom wall measured as perpendicular distance from the vertical plane containing the rear opening 6. The top wall 4 also has a slot 8 on its upper surface for attachment of various sizes and shapes of handle 14 for different uses or for the comfort of the person using the apparatus. The handle attachments are well known to those skilled in the art. It should suffice to indicate that a telescoping or longer handle can be used for older or disabled people who cannot bend over, or a shorter handle be used to provide more leverage for the younger and stronger user that wants to bend over and scoop into the apparatus.

Figure 4:
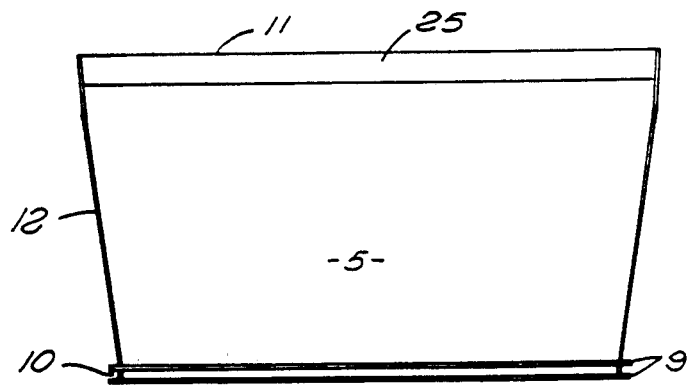
FIG. 4 is a top plan cross sectional view showing the bottom section of the apparatus as shown in FIG. 1.
Figure 5:
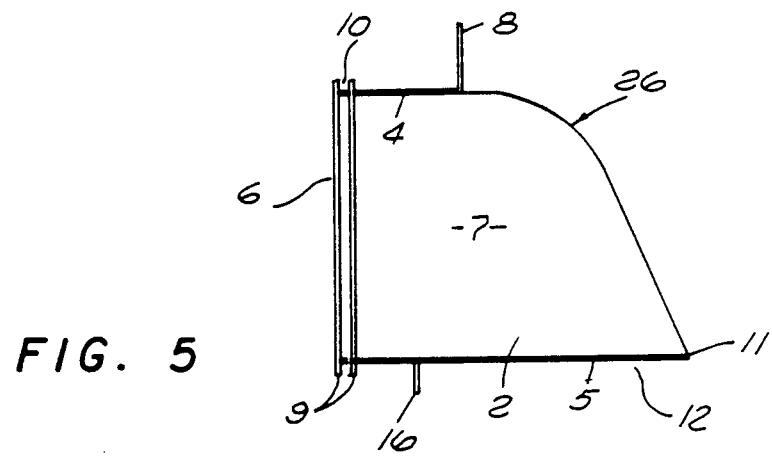
FIG. 5 is a lateral cross sectional view of the apparatus taken along the line A—A of FIG. 1.
Figure 6:
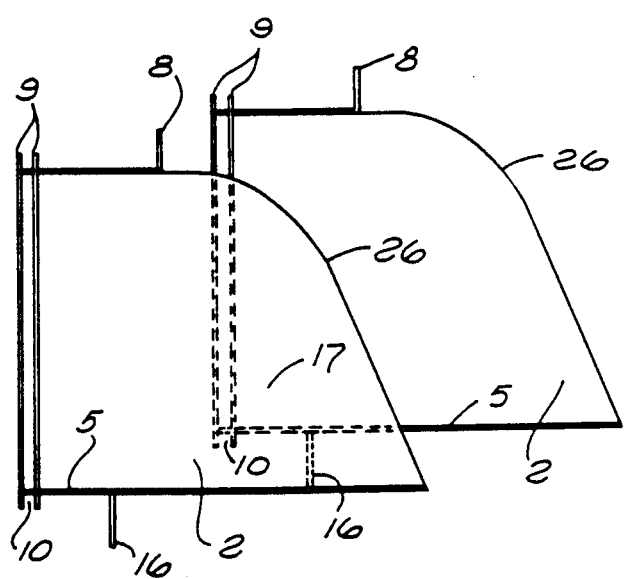
FIG. 6 is a lateral cross sectional view of two of the apparatus as shown in FIG. 5 in a stacking position.

Referring now to FIGS. 4 and 5, the side walls 2 and 3 include the edges 26 and 27 extending outwardly and downwardly towards the front and to the side. As shown in FIG. 5, the apparatus are stacked by placing one of the apparatus inside the frontal opening 17 of the second apparatus. The tilting structure 16, in the form of a strip, at the bottom wall 5 of the apparatus provides tilting to the frontal part of the bottom wall 5 with the tapered edge 12 and the slight rake 11 towards the ground. The tilting structure is generally positioned closer to the rear edges of the apparatus and preferably at a distance, from the near edges, of about one-third of the length of the bottom wall.

It will be recognized by those skilled in the art that the apparatus (except the bag retainer or strap 19) of the present invention includes those formed by molding from plastic of various types. Alternatively, the apparatus (except the bag retainer or strap 19) for catching debris can be manufactured from any lightweight plastic, vinyl, PVC, fiberglass or similar material or by-product, well known to those skilled in the art, that is strong and durable enough to withstand yard use. Wood, aluminum, sheet metal, or other lightweight metal products could also be used in the construction for the apparatus.

It will also be recognized that although an apparatus having a generally rectangular shape is illustrated in FIG. 1, that any shape housing may be used so long as it has a lip and channel where a strap/bag retainer is used to hold a plastic bag to receive debris from the frontal opening by sweeping, raking or scooping. During operation for catching debris, a plastic bag 20 is first strapped onto the apparatus of the present invention by the bag retainer or strap 19 into the channel 10 between the lips 9. The bag retainer or strap can be an elastic cord with a Velcro hook, metal hook or snap, bungee cord with hooks; moving strap (nylon or other strong material) with a clamp or Velcro hook, rope; large rubber band; continuous rolled spring and metal strap with spring clamp or the like. As will be appreciated by those skilled in the art, the strap or bag retainer should be of a width and length to fit snugly in the channel to hold the plastic bag firmly in place. After the plastic bag has been strapped in place, the apparatus may sit flat on the ground, freestanding so that debris can be swept or raked into the leading edge of the apparatus. In another application, the apparatus can be hooked onto a wall or other forms or just sit on the ground where debris may be shoveled into it. Once the bag is full, the bag retainer or strap 19 can be unstrapped and the plastic bag removed and replaced with a new bag.

Those skilled in the art will fully appreciate that the preferred embodiment shown and desirable to illustrate the invention is exemplary only and that the same invention may take forms different from the specific illustrative embodiments disclosed. Thus, specific illustrative embodiments are not necessarily to be interpreted as limiting, rather, the invention should be limited only by the scope of the claims which follow, and should be interpreted as encompassing all constructions fairly regardable as mechanically equivalents of the subject matter to which claims are directed.

Having described our invention, what we claim and desire to secure by Letters Patent is:

1. An apparatus for directing debris of a surface, from the surface into a debris storing bag, the apparatus comprising:

a circumferential housing, having a front opening at one end and a rear opening at another end, the region between the front and rear openings defining a debris directing chamber, and a retaining channel disposed around a substantial part of the periphery of the housing adjacent the rear opening, the rear opening adapted for removably receiving and retaining the debris storing bag, the housing defining a bottom wall for being positioned adjacent to the surface;

strap means for being positioned in the retaining channel for clamping and holding the debris storing bag, the debris storing bag being clamped between the strap means and the retaining channel;

tilting means extending from the bottom wall of the housing for supporting the apparatus, the tilting means extending from the bottom wall of the housing at a location nearer the rear opening than the front opening for tilting the front opening downwardly adjacent to the surface and raising the rear opening of the housing above and spaced from the surface, the tilting means comprising a strip extending from the bottom wall, the strip positioned along the bottom wall one-third the distance from the rear opening toward the front opening.

2. The apparatus of claim 1 wherein the tilting means is about one inch in height.

* * * * *